Nov. 4, 1958

L. L. HERCIK 2,858,552

BEVEL CLOSING DIE HEAD HAVING REPLACEABLE AND
SELECTIVELY POSITIONABLE INSERT WEAR RING

Filed May 28, 1954

INVENTOR.
Lad L. Hercik
BY
Hyde, Meyer, Baldwin & Doran
ATTORNEYS

United States Patent Office 2,858,552
Patented Nov. 4, 1958

2,858,552

BEVEL CLOSING DIE HEAD HAVING REPLACEABLE AND SELECTIVELY POSITIONABLE INSERT WEAR RING

Lad L. Hercik, Lakewood, Ohio

Application May 28, 1954, Serial No. 433,127

8 Claims. (Cl. 10—95)

This invention relates to improvements in a thread cutting apparatus and more particularly to a thread cutting die head.

One of the objects of the present invention is to provide a thread cutting die head having a thread cutting chaser holder moving surface designed so as to give accuracy of adjustment over a long wear life.

A further object of the present invention is to provide a die head having a plurality of thread cutting chaser holder slides movable inwardly and outwardly between extreme positions wherein the thread cutting force and a resilient means coact to move quickly the slides in one direction between said positions.

Other features of this invention reside in the arrangement and design of the parts for carrying out their appropriate functions. Other objects and advantages of this invention will be apparent from the accompanying drawings and description and the essential features will be set forth in the appended claims.

In the drawings,

Fig. 2 is a vertical, longitudinal sectional view through the center of the die head in Fig. 1 with all thread cutting chasers removed and with actuating mechanism for the die head added thereto; while

Those familiar with this art will recognize that the present invention may be applied in many ways, but I have chosen to illustrate the same in an expandable die head for cutting threads on the outer surface of a workpiece.

Figure 2:
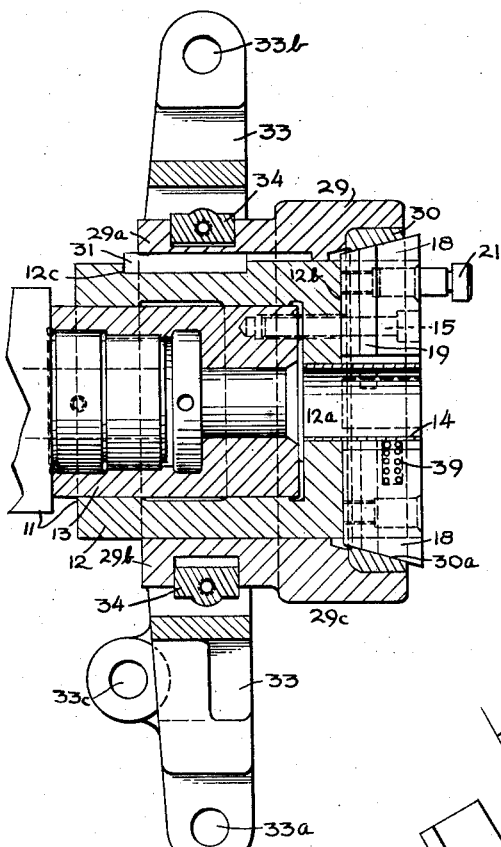
Figure 1:
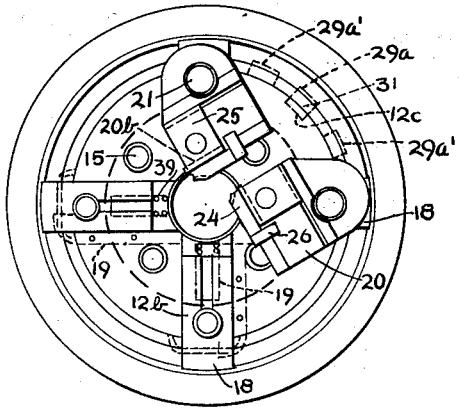
Fig. 1 is a front elevational view of the die head of the present invention with some of the thread cutting chasers removed therefrom to show additional details.

The die head is shown in the drawings on a threading machine of any conventional type having a rotatable spindle 11 upon which is secured a spindle adaptor 13, and having a die head body member or barrel 12 secured to adaptor 13 by bolts 15 so that barrel 12 is rotatably carried by the spindle 11. This barrel has a central opening 12a lined with a hardened steel bushing 14 for the reception of stock or a work piece to be threaded. The barrel or body member 12 is generally cylindrical and is provided at its forward end (at the right end in Fig. 2) with a plurality of radially extending pockets 12b, in the present instance four of such pockets being provided. Radially slidable in each pocket 12b is a die slide 18. These thread cutting chaser holder slides 18 are circumferentially equally spaced on the body member 12 about the axis of rotation of the rotatable spindle 11 and the die head. This axis coincides with the central, longitudinal axis of the work piece to be threaded. These slides 18 are movable inwardly and outwardly between respectively a thread cutting position and a clearance position for removal from work piece 10 in Fig. 3. Each slide is removably held within its pocket 12b and has its movement restricted to a generally radial movement by a key 19. Each key 19 is located in aligned keyway portions in its associated slide 18 and a wall of its pocket 12b as shown in Figs. 1 and 2.

Each slide 18 has detachably mounted thereon a thread cutting chaser or die 24 for cutting threads on the periphery of work piece 10. A thread cutting chaser holder block 20 is secured to each slide 18 by a bolt 21 so that they move together. Hence, the term "thread cutting chaser holder slide" as used herein, applies equally well not only to the combined slide and block movable together in the illustrated construction but also to the slide per se when the thread cutting chaser is mounted directly thereon. In the illustrated construction, each holder block 20 has a flat face 20b to which is secured its associated die or thread cutting chaser 24 in proper thread cutting position generally but not exactly tangential to the work piece 10. An inset chaser clamp 25 detachably secures the chaser 24 to the holder block 20 by a threaded screw in the conventional manner. A back stop block 26 is detachably secured to each chaser holder block 20 for backing up the thread cutting chaser 24 associated therewith and absorbing the thread cutting force exerted thereon.

Figure 3:
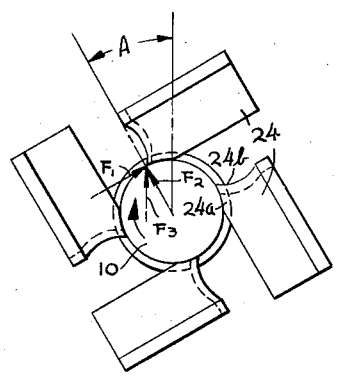
Fig. 3 is an enlarged front elevational view of all four thread cutting chasers from the central portion of Fig. 1 shown in thread cutting position on the work piece.

Each chaser 24, as shown in Fig. 3, is set generally tangentially to the work piece 10 for cutting threads thereon. Each thread cutting chaser 24 has arcuately manufactured therein across its entire width the thread form 24a, with this thread form either milled, ground, or otherwise formed therein to provide a true and correct thread contour. As the thread cutting chaser 24 becomes worn and dull, it is ground back along the surface 24b back to the dotted line thereon in Fig. 3 so as to sharpen the cutting edges thereof.

Means is provided for controlling the radial position of the die slides 18. This takes the form in the present invention of a slide actuator member including a die ring member 29 telescopically mounted on the barrel member 12 for axial movement thereon. A Timken bearing race cup or ring 30 is secured by a press fit in a counter bore on the right face of the die ring 29 in Fig. 2. This inserted ring 30 has a camming surface formed by a tapered bore 30a therein coacting with the outer surface of the die head slides 18 for simultaneously moving them inwardly to the thread cutting position wherein the thread cutting chasers 24 assume the position shown in Fig. 3. This inward movement of slides 18 is caused by moving die ring 29 toward the right in Fig. 2.

A yoke 33 of conventional construction is provided in the present disclosure to move the die ring 29 in this manner. This yoke 33 is pivotally connected by an adjustable pivot connection to the threading machine frame at either 33a or 33b with an actuating link pivotally connected at 33c, for example, for oscillating the yoke 33 about its fixed pivot. A clutch ring or bearing shoes 34 are pivotally carried by the yoke 33 and ride in an annular groove 29b on the die ring 29. Then, oscillation of the yoke 33 about its adjustable pivot will move the die ring 29 axially on the die head barrel member 12 even though the die ring member 29 may be rotatably carried by the die head body member 12 and spindle 11.

The die head body or barrel member 12 and the die ring member 29 are keyed together by a key and keyway connection therebetween so that these members rotate together and can move axially relative to each other. A key 31 is provided for this purpose with this key being mounted in the keyway portion 12c in the periphery of barrel member 12 and keyway portion 29a in the bore of the die ring member 29. The keyway portion 29a is sufficiently long to permit axial movement of the die ring member 29 while the keway portion 12c snugly fits the key 31 to prevent relative axial movement therebetween.

Several structural features in this die head are provided to compensate for wear so that the accuracy of the die head will always be maintained. During the axial movement of the die ring member 25, wear occurs between the conical tapered surfaces on the outer portions of the slides 18 and the tapered bore 30a of the slide actuator member. Since the die ring 29 and tapered bore 30a are constructed in two separate pieces by providing the insert ring 30, accuracy can be readily maintained.

First, this bearing race ring 30 of the Timken type is extremely hard and will have a long wear life on its smooth, accurately ground tapered bore 30a. Hence, making the ring 30 separate from the die ring member 29 provides longer wear life by an inexpensive construction wherein die ring member 29 and ring 30 may be made of different materials.

Second, the key and keyway construction between the members 12 and 29 may be arranged to permit turning the members relative to each other so that the die slides 18 engage a different portion of the tapered bore 30a after the bore 30a has become worn. Here, the bore of the die ring 29 has a plurality of circumferentially spaced keyway portions 29a' as well as the keyway portion 29a with each being alignable with the key 31 carried by the barrel member 12. The angular spacing between adjacent keyway portions 29a, 29a', is approximately equal to the angle of contact between the outer portion of each slide 18 and the tapered bore 30a. Hence, the key 31 may be moved to another one of the keyway portions 29a, 29a' by axial disassembly and then reassembly of the members 12 and 29 in the new location so as to place a new wear portion of the tapered bore 30a in contact with each slide 18. These keyway portions 29a' may be either precut in the die ring member 29 or cut when needed. Here, the key 31 is carried by the member 12 with the plurality of keyway portions in the member 29, but it should be readily understood that the key 31 could be carried by the member 29 with the plurality of keyway portions in member 12 instead.

Third, the ring 30 may be removed from the die ring member 29 when it has worn excessively and replacement is desired. An annular groove 29c in the die ring member 29 makes possible easy removal of this press fit ring 30 while providing clearance between the die ring member 29 and the slide 18 to prevent interference therebetween during slide actuation.

The closing operation of the die head should now be apparent. As the slide actuator die ring member 29 moves from a first position on the left toward the right to a second position (the thread cutting position in Fig. 2), the tapered bore 30a positively moves the slides 18 inwardly from the work piece clearance position to the thread cutting position (Fig. 3).

The die head may also be opened as well as closed. The die head is constructed so that certain forces coact to open it by moving the slides 18 outwardly to the clearance position for removal from the workpiece when the die ring member 29 moves toward the left to return it from the second to the first position. This die head opening is not a positive action, but relies on radial forces caused inherently by the die head design.

Quick outward or release movement of each slide 18 to its outward clearance position is always desirable as the taper bore 30a is moved toward the left back to the first position because then neither the thread being cut, the thread cutting chasers, nor the die head will be damaged. Quick release requires that each slide 18 move radially with minimum side binding in its pocket 12b. Hence, it is desirable that none of the forces exerted on the slides tend to bind them. The forces exerted during thread cutting by the workpiece on each slide 18 through the cutting tip of its associated thread cutting chaser can be resolved into a radial force F2 (Fig. 3) and a tangential force F1 acting on the thread chaser cutting tip.

If this cutting tip is located on the radially extending center line of its associated slide 18, only the radial force will tend to open the die head while the tangential force will push the associated slide 18 against the side of its pocket 12b to cause binding and to prevent quick release. The slide binding may be sufficient to prevent outward slide movement unless a prohibitively large additional radially outward force is exerted on each slide.

Part of the slide opening force in the present construction is provided by a compression spring 39 or equivalent resilient means located between the barrel bushing 14 and each die slide 18. The outer end of each spring 39 is housed in an inwardly extending bore in its associated die slide 18. Each spring, operatively connected between this bushing 14 of the body member 12 and its associated slide 18, exerts a radially outward force to help move the slide 18 outwardly to the clearance position upon axial movement by the die ring member 21 toward the left back to its first position.

A second force coacts with the spring force to open each die head slide 18. It has been found that by advancing the cutting tip circumferentially around the workpiece to a new position, as shown for example in Fig. 3, the radial force F2 and tangential force F1 will have their resultant force F3 extending substantially along the direction of slide movement or at least close thereto so as to eliminate or substantially reduce any side binding tendency on the slide. The simple construction and smoothness of the coacting surfaces on tapered bore 30a and each slide 18 also reduce any binding tendency. Now the thread cutting force coacts with the spring force to provide a quick release.

Experimentation has revealed that under the following conditions a die head will quickly open during thread cutting whenever desired: (1) angle A in Fig. 3 is $30° \pm 10°$, (2) the workpiece or stock 10 is about 1½ inches or smaller in diameter and is formed of ferrous material, (3) the width of each thread chaser 24 in the axial direction is approximately 15/32 inches, (4) 6 threads per inch are being cut on the workpiece 10, and (5) each spring 39 is an 11 pound spring. When less cutting load is encountered, a 20° angle may be satisfactory. This 11 pound spring would not be satisfactory if each thread chaser cutting tip were on the radially extending center line of its slide 18. Since only a small spring is required in the present construction, the yoke 33 can be easily actuated during closing of the die head without tiring the machine operator or putting undue force on the operating parts.

Various changes in details and arrangement of parts can be made by one skilled in the art without departing from the spirit of this invention or the scope of the appended claims.

What I claim is:

1. A tool, comprising a body, a plurality of machining slides circumferentially spaced on said body about an axis, each slide being movable in a generally radial direction between workpiece machining and clearance positions for removal from the workpiece, a slide actuator having an insert ring with a tapered frusto-conical surface having one set of surface portions engaging portions of said slides to move them to said machining position upon axial relative movement of said conical surface and slides in one direction, said insert ring being replaceable when its conical surface has worn excessively, and lock means on said body, said ring and said slide actuator independent of said slides for orienting said insert ring relative to said slides to bring another set of surface portions on said conical surface into engagement with said slides, said actuator having a cylindrical bore surface, an insert ring being a hard and accurate bearing race ring having a cylindrical peripheral locating surface frictionally engaged in said slide actuator cylindrical bore 2. A tool, comprising a body, a plurality of machining slides circumferentially spaced on said body about an axis, each slide being movable in a generally radial direction between workpiece machining and clearance positions for removal from the workpiece, a slide actuator having an insert ring with a tapered frusto-conical surface having one set of surface portions engaging portions of said slides to move them to said machining position upon axial relative movement of said conical surface and slides in one direction, said insert ring being replaceable when its conical surface has worn excessively, and lock means on said body, said ring and said slide actuator independent of said slides for orienting said insert ring relative to said slides to bring another set of surface portions on said conical surface into engagement with said slides, said last mentioned means including on said insert ring an annular peripheral locating surface engaging with a friction fit the remainder of said slide actuator to prevent relative rotation therebetween with said peripheral surface coaxial with said frusto-conical surface, whereby said insert ring may be replaced when worn and may be assembled in the remainder of said slide actuator in any rotational position.

3. A tool, comprising a body, a plurality of machining slides circumferentially spaced on said body about an axis, each slide being movable in a generally radial direction between workpiece machining and clearance positions for removal from the workpiece, a slide actuator having an insert ring with a tapered frusto-conical surface having one set of surface portions engaging portions of said slides to move them to said machining position upon axial relative movement of said conical surface and slides in one direction, said insert ring being replaceable when its conical surface has worn excessively, and lock means on said body, said ring and said slide actuator independent of said slides for orienting said insert ring relative to said slides to bring another set of surface portions on said conical surface into engagement with said slides, said actuator having a cylindrical bore surface, said insert ring about its circumference having a uniform longitudinal section determined by a radial plane coplanar with said axis, said insert ring being a hard and accurate bearing race ring having an annular cylindrical peripheral locating surface frictionally engaged in said slide actuator cylindrical bore surface to prevent relative rotation therebetween with said peripheral surface coaxial with said frusto-conical surface, whereby said insert ring may be replaced when worn and may be assembled in the remainder of said slide actuator in any rotational position.

4. A tool, as set forth in claim 3, wherein said corresponding surface portions in said two sets have their edges approximately contiguous.

5. A tool, comprising a body, a plurality of machining slides circumferentially spaced on said body about an axis, each slide being movable in a generally radial direction between workpiece machining and clearance positions for removal from the workpiece, a slide actuator having an insert ring with a tapered frusto-conical surface having one set of surface portions engaging portions of said slides to move them to said machining position upon axial relative movement of said conical surface and slides in one direction, said insert ring being replaceable when its conical surface has worn excessively, and lock means on said body, said ring and said slide actuator independent of said slides for orienting said insert ring relative to said slides to bring another set of surface portions on said conical surface into engagement with said slides; said last mentioned means including on said insert ring an annular peripheral locating surface engaging with a friction fit the remainder of said slide actuator to prevent relative rotation therebetween with said peripheral surface coaxial with said frusto-conical surface, including telescopic annular surfaces on said body and the remainder of said slide actuator to provide said axial relative movement, and including keying means operatively connecting said body and the remainder of said slide actuator at said telescopic annular surfaces, whereby said insert ring may be replaced when worn and may be assembled in the remainder of said slide actuator in any rotational position relative to said keying means.

6. A tool, comprising a body, a plurality of machining slides circumferentially spaced on said body about an axis, each slide being movable in a generally radial direction between workpiece machining and clearance positions for removal from the workpiece, a slide actuator having an insert ring with a tapered frusto-conical surface having one set of surface portions engaging portions of said slides to move them to said machining position upon axial relative movement of said conical surface and slides in one direction, said insert ring being replaceable when its conical surface has worn excessively, and lock means on said body, said ring and said slide actuator independent of said slides for orienting said insert ring relative to said slides to bring another set of surface portions on said conical surface into engagement with said slides; said last mentioned means including a key and keyway with each having axially extending coacting keying surfaces substantially fully engaging along their full axial length and determining the engagement relationship between the set of slide surface portions and said conical surface, said keying surfaces defining a uniform cross section throughout their axial length, whereby said axially extending keying surfaces resist wear and assure accuracy of and holding of said relationship.

7. A tool, comprising a body; a plurality of machining slides circumferentially spaced on said body about an axis, each slide being movable in a generally radial direction between workpiece machining and clearance positions for removal from the workpiece; a slide actuator having an insert ring with a tapered frusto-conical surface having one set of surface portions engaging portions of said slides to move them to said machining position upon axial relative movement of said conical surface and slides in one direction, said insert ring being replaceable when its conical surface has worn excessively; and lock means on said body, said ring and said slide actuator independent of said slides for orienting said insert ring relative to said slides to bring another set of surface portions on said conical surface into engagement with said slides; said tool being an expandible die head; said slides being thread cutting chaser holder slides with thread cutting chasers thereon; said insert ring being a hard and accurate bearing race ring; said last mentioned means including on said insert ring a cylindrical peripheral locating surface engaging with a friction fit the remainder of said slide actuator to prevent relative rotation therebetween with said peripheral surface coaxial with said frusto-conical surface, including telescopic cylindrical surfaces on said body and the remainder of said slide actuator to provide said axial relative movement, and including keying means operatively connecting said body and the remainder of said slide actuator at said telescopic cylindrical surfaces, whereby said insert ring may be replaced when worn and may be assembled in the remainder of said slide actuator in any rotational position relative to said keying means; said keying means including a key and keyway carried by said respective telescopic cylindrical surfaces with each having axially extending coacting keying surfaces substantially fully engaging along their fully axial length and determining the engagement relationship between the set of slide surface portions and said conical surfaces, said keying surfaces being of uniform cross section throughout their axial length, whereby said axially extending keying surfaces resist wear and assure accuracy of and holding of said relationship; said insert ring about its circumference having a uniform longitudinal section determined by a radial plane coplanar with said axis; and said corresponding surface portions in said two sets having their closest edges approximately contiguous.

8. A tool, as set forth in claim 7, with said body and slides being fixed against axial movement, and said slide actuator being movable axially relative to said body and slides.

References Cited in the file of this patent

UNITED STATES PATENTS

| | | |
|---|---|---|
| 454,197 | Ament | June 16, 1891 |
| 877,925 | Hartness | Feb. 4, 1908 |
| 1,068,612 | Vaught | July 29, 1913 |
| 1,290,885 | Bolender | Jan. 14, 1919 |
| 1,713,319 | Barteit | May 14, 1929 |
| 2,219,944 | Schoepe | Oct. 29, 1940 |